United States Patent
Cezar et al.

(10) Patent No.: US 6,584,492 B1
(45) Date of Patent: Jun. 24, 2003

(54) INTERNET BANNER ADVERTISING PROCESS AND APPARATUS HAVING SCALABILITY

(75) Inventors: Robert Cezar, Arroyo Grande, CA (US); James Heintz, Pismo Beach, CA (US); Mario Mene, Ortona (IT); Luigi Caramico, Rome (IT)

(73) Assignee: AmeriCom USA, Arroyo Grande, CA (US)

( * ) Notice: Subject to any disclaimer, the term of this patent is extended or adjusted under 35 U.S.C. 154(b) by 0 days.

(21) Appl. No.: 09/488,666

(22) Filed: Jan. 20, 2000

(51) Int. Cl.[7] ............................................. G06F 13/00
(52) U.S. Cl. ..................................................... 709/203
(58) Field of Search ................................ 705/1, 14, 26, 705/27, 79; 707/500; 709/200, 203, 217, 218, 219, 224, 227, 229

(56) References Cited

U.S. PATENT DOCUMENTS

| | | | | | |
|---|---|---|---|---|---|
| 5,710,887 A | * | 1/1998 | Chelliah et al. | ............... | 705/26 |
| 5,712,979 A | * | 1/1998 | Graber et al. | ............... | 709/224 |
| 5,717,860 A | * | 2/1998 | Graber et al. | ............... | 709/227 |
| 5,721,827 A | * | 2/1998 | Logan et al. | ............... | 709/217 |
| 5,724,424 A | * | 3/1998 | Gifford | ........................ | 705/79 |
| 5,727,156 A | * | 3/1998 | Herr-Hoyman et al. | ...... | 709/219 |
| 5,737,619 A | * | 4/1998 | Judson | ........................ | 707/500 |
| 5,740,549 A | * | 4/1998 | Reilly et al. | ................... | 705/14 |
| 5,751,956 A | * | 5/1998 | Kirsch | ........................ | 709/203 |
| 5,757,917 A | * | 5/1998 | Rose et al. | .................... | 705/79 |
| 5,933,811 A | * | 8/1999 | Angles et al. | ................. | 705/14 |
| 5,937,392 A | * | 8/1999 | Alberts | ........................ | 705/14 |
| 5,948,061 A | * | 9/1999 | Merriman et al. | .......... | 709/219 |

* cited by examiner

Primary Examiner—Robert B. Harrell
(74) Attorney, Agent, or Firm—William Michael Hynes; Townsend and Townsend and Crew LLP

(57) ABSTRACT

A process of banner advertising display on an inquiring browser viewing a website over the Internet includes inquiring from the inquiring browser to a website authorizing display of banner advertising. Diversion from the website to an advertising system central controller occurs. The inquiring browser is supplied with code to enable sorting of a group of Internet ad addresses relative to the classification information related to the frequency of desired ad play. Sorting the Internet ad addresses relative to the classification information related to the frequency of desired ad play of each ad at the inquiring browser to form a sequential play list occurs at the browser. A process for accumulating the reports of ad play utilizing query strings is set forth in which the query strings are serially recorded, occasionally polled, and compiled into advertising system central controller in compatible reports. The concept of classification of the websites with corresponding group classification of ads to be run is used to edit ad availability from an extraordinarily large number of available ads to a manageable play list which can be sorted at the browser. Finally, a system of ordering the play of ads in the overall process of playing many ads against targeted numbers of ad plays is disclosed enabling total ad play to be centrally controlled with minimal computational burden on the advertising system central controller.

41 Claims, 8 Drawing Sheets

| AD ID | No. of Desired Plays | No. of Actual Plays | Weighted Δ |
|---|---|---|---|
| 1 | 10,000 | 0 | 0 |
| 2 | 10,000 | 0 | 0 |
| 3 | 10,000 | 0 | 0 |
| 4 | 10,000 | 0 | 0 |

Initial Ads (No Δ)
Time = T

FIG. 7A

| AD ID | No. of Desired Plays | No. of Actual Plays | Weighted Δ |
|---|---|---|---|
| 1 | 10,000 | 5,000 | 0.5 |
| 2 | 10,000 | 3,000 | 0.3 |
| 3 | 10,000 | 1,000 | 0.1 |
| 4 | 10,000 | 500 | 0.05 |

Not Sorted for Δ
Time = T+5

FIG. 7B

| AD ID | No. of Desired Plays | No. of Actual Plays | Weighted Δ |
|---|---|---|---|
| 4 | 10,000 | 500 | 0.05 |
| 3 | 10,000 | 1,000 | 0.1 |
| 2 | 10,000 | 3,000 | 0.3 |
| 1 | 10,000 | 5,000 | 0.5 |

Sorted for Δ
Time = T+5

FIG. 7C

| AD ID | No. of Desired Plays | No. of Actual Plays | Weighted Δ |
|---|---|---|---|
| 4 | 10,000 | 5,500 | 0.55 |
| 3 | 10,000 | 4,000 | 0.4 |
| 2 | 10,000 | 4,000 | 0.4 |
| 1 | 10,000 | 5,500 | 0.55 |

Not Sorted for Δ
Time = T+10

FIG. 7D

| AD ID | No. of Desired Plays | No. of Actual Plays | Weighted Δ |
|---|---|---|---|
| 3 | 10,000 | 4,000 | .4 |
| 2 | 10,000 | 4,000 | .4 |
| 4 | 10,000 | 5,500 | .55 |
| 1 | 10,000 | 5,500 | .55 |

Sorted by Δ
Time = T+10

FIG. 7E

| AD ID | No. of Desired Plays | No. of Actual Plays | Weighted Δ |
|---|---|---|---|
| 3 | 10,000 | 9,000 | .9 |
| 2 | 10,000 | 7,000 | .7 |
| 4 | 10,000 | 6,500 | .65 |
| 1 | 10,000 | 6,000 | .6 |

Not Sorted for Δ
Time = T+15

FIG. 7F

INTERNET BANNER ADVERTISING PROCESS AND APPARATUS HAVING SCALABILITY

CROSS-REFERENCES TO RELATED APPLICATIONS

This application relates to U.S. patent application Ser. No. 09/291,785 filed Apr. 14, 1999 by Robert M. Cezar entitled Internet Advertising with Controlled and Timed Display of Ad Content from Centralized System Controller, now U.S. Pat. No. 6,128,651 issued Oct. 3, 2000. In that disclosure Cezar—one of the named inventors herein—disclosed a system for the placement of banner ads on websites consenting to the placement of such ads. This system was chiefly characterized by altering the inquiring browser on line and placing a frame for the display of advertising on the browser. The website diverted the inquiring browser to receive the alteration from an advertising system central controller. Thereafter, ads were sequentially played on the browser. In all other respects, the website remained unaltered allowing search engine exploration of the websites without the engines become recursively trapped in such sites.

We also disclosed the concept of placing ads in priority of play categories, the categories being designated from most important—Category A—to least important—Category E. The idea behind the priority of play categories was to play all Category A ads first, Category B ads second, etc. At the time the above patent application was filed, each time an ad was played, a separate call was made on the central controller for instruction.

Additionally, this application relates to U.S. patent application Ser. No. 09/335,384 filed Jun. 17, 1999 by Robert M. Cezar and James Heintz entitled Internet Advertising with Controlled and Timed Display of Ad Content From Browser, now U.S. Pat. No. 6,161,127 issued Dec. 12, 2000 In that disclosure, scalability was achieved by providing a list of ads to be run to the browser. On the first call from the browser, the advertising central controller delivered a "play list" of ordered Internet ad addresses. The browser was programmed over the Internet by the advertising system central controller to play sequentially the ads in the list. This list essentially cut the communication between the central advertising controller and browser to a group of contacts confined the alteration of the browser and the delivery of the ordered list of ad addresses to be played to the very beginning of the browser website Internet session.

This system described in the above two Patent Applications is to be distinguished from banner advertising schemes in which the website defines the spatial interval in which the advertising banner is to appear. See U.S. Pat. No. 5,948,061 Merriman, et al. Sep. 7, 1999 entitled Method of delivery, targeting, and measuring advertising over networks. In that advertising scheme, the website defines and interval for the placement of an ad. A central controller furnishes to a browser the Internet (URL) address of information to be placed in the defined interval from the website.

It is to be understood that the above two patent applications are incorporated by reference into this disclosures as if set forth fully herein.

This invention relates to the Internet and more particularly to banner ads played on the Internet. An apparatus and process relating to scalability of an Internet banner advertising process and apparatus is disclosed.

BACKGROUND OF THE INVENTION

Banner advertising on the Internet is computationally intensive on the central advertising controller. To fully understand this problem, it is necessary to understand the principal components contributing to such advertising. For the purpose of setting forth the problem encountered, we will refer to the advertising schemes set forth in the above two Cezar applications; it will be understood that the problems there set forth are equally applicable to the Merriman et al '061 Patent.

In so-called banner advertising, an inquiring browser connects over the Internet to a customer website. Immediate and temporary diversion occurs from the customer website to the advertising system central controller. During this diversion as set forth in the Cezar and Heintz disclosures, the inquiring browser is altered to install upon its screen a frame set in which advertising messages can subsequently be displayed. Further, and, a list of ads to be played is furnished to the inquiring browser. Thereafter, the inquiring browser loads the remainder of the webpage and normal webpage viewing occurs with banner advertising being presented to the viewer of the browser.

While normal web page viewing occurs, ads from the list of ads provided are fetched on the Internet and played in the frame set provided on the modified browser. Each ad will remain for a designated period of time, time out, and be replaced by a new ad fetched by the browser over the Internet. Alternately, the ad can be "clicked." This clicking usually causes diversion of the browser to a Internet address designated by the advertiser. In the case of the "timing out" of ad play, or a "click" on the ad, a report is made from the browser to the advertising system central controller in the form of a "query string". Such a report is in the format of a URL address, a sub file name for the destination within a server at the URL address, an instruction for storage of the attached data at the sub file in the server, and the finally the data to be stored.

As will hereafter be further emphasized, the system described in our preceding U.S. patent application Ser. No. 09/291,785 filed Apr. 14, 1999 by Robert M. Cezar entitled Internet Advertising with Controlled and Timed Display of Ad Content from Centralized System Controller, now U.S. Pat. No. 6,128,651 issued Oct. 3, 2000, and U.S. patent application Ser. No. 09/335,384 filed Jun. 17, 1999 by Robert M. Cezar and James Heintz entitled Internet Advertising with Controlled and Timed Display of Ad Content From Browser, now U.S. Pat. No. 6,161,127 issued Dec. 12, 2000 are what we term "report systems." These systems do not send or record a report of an ad being played to the advertising system central controller until the ad has in fact "timed out" at the inquiring browser. This is to be distinguished from so-called "pull systems" which bill the advertiser when a request is made for the URL address of the ad. Generally, it is believed to be more favorable to the advertiser to bill only for advertising displayed for the full intended period of "play time."

Two advantages are realized by the Cezar and Heintz disclosure. First, a report and following charge to the advertiser is only made when an ad either times out or alternately is "clicked." Second, the timing of the receipt of the query string at the server is not critical; such reports can come in piece meal from the Internet over widely spaced time periods and not interfere with system operation.

The advent of supplying a "list" of ads to be played to the browser represented a reduced computational load on the advertising system central controller. However, as banner advertising has expanded, required computation has expanded. For example, the advertising system central controller had to compute and supply for every inquiring browser and ordered list of ad addresses to be played during the browser/website session. Each inquiring browser hitting on a customer website required a advertising system central controller computation of an ordered play list customized to the website.

Advertising banner systems can be called on to serve hundreds of thousands of websites. The computation of correspondingly hundreds of thousands of play lists can be computationally intensive on an advertising system central controller. We have discovered the need for an advertising system, which system takes full advantage of the distributed computer intelligence present in the Internet. The idea is to minimize the computational load on the central controller. This enables a central controller to service a greater volume of website advertising. Additionally, it leaves the advertising system central controller free for the necessary tasks of advertising system administration, reporting and billing. Prior systems have not been designed with this goal in mind.

It is to be understood that recognition of the problem to be solved constitutes invention. In so far as we are the first to recognize this problem, we claim invention. Accordingly, we disclose a system design having as its principal objective the minimization of computational activity at the advertising system central controller and the distribution of the advertising task to the distributed intelligence of the Internet including the browser.

SUMMARY OF THE INVENTION

A process of banner advertising display on an inquiring browser viewing a website over the Internet includes inquiring from the inquiring browser to a website authorizing display of banner advertising. Diversion from the website to an advertising system central controller occurs. The central controller has a group of Internet ad addresses of each ad and classification information related to a frequency of desired ad play. The inquiring browser displays a frame set for location of an advertising banner, which frame set is either supplied by the webpage or preferably installed on line through alteration of the browser. The system is weighted to take computational load off the advertising system central controller and apply a distributed computation load through the Internet or exterior components of the main database of the advertising system central controller. The inquiring browser is supplied with code to enable sorting of the group of Internet ad addresses relative to the classification information and related to the frequency of desired ad play at the inquiring browser. Further, a group of Internet ad addresses with classification information enabling ordering of ad play at one inquiring browser relative to frequency of ad play at other inquiring browsers is provided. Additionally, sorting the Internet ad addresses relative to the classification information related to the frequency of desired ad play of each ad at the inquiring browser to form a sequential play list occurs at the browser and not the central controller. A process for accumulating the reports of ad play utilizing query strings is set forth in which the query strings are serially recorded, occasionally polled, and compiled into advertising system central controller compatible reports. The concept of classification of the websites with corresponding group classification of ads to be run is used to edit ad availability from an extraordinarily large number of available ads to a manageable play lists which can be sorted at the browser. Finally, a system of ordering the play of ads in the overall process of playing many ads against many targeted numbers of plays is disclosed enabling total ad play to be centrally controlled with minimal computational burden on the advertising system central controller.

DESCRIPTION OF THE SPECIFIC EMBODIMENTS

Figure 1:
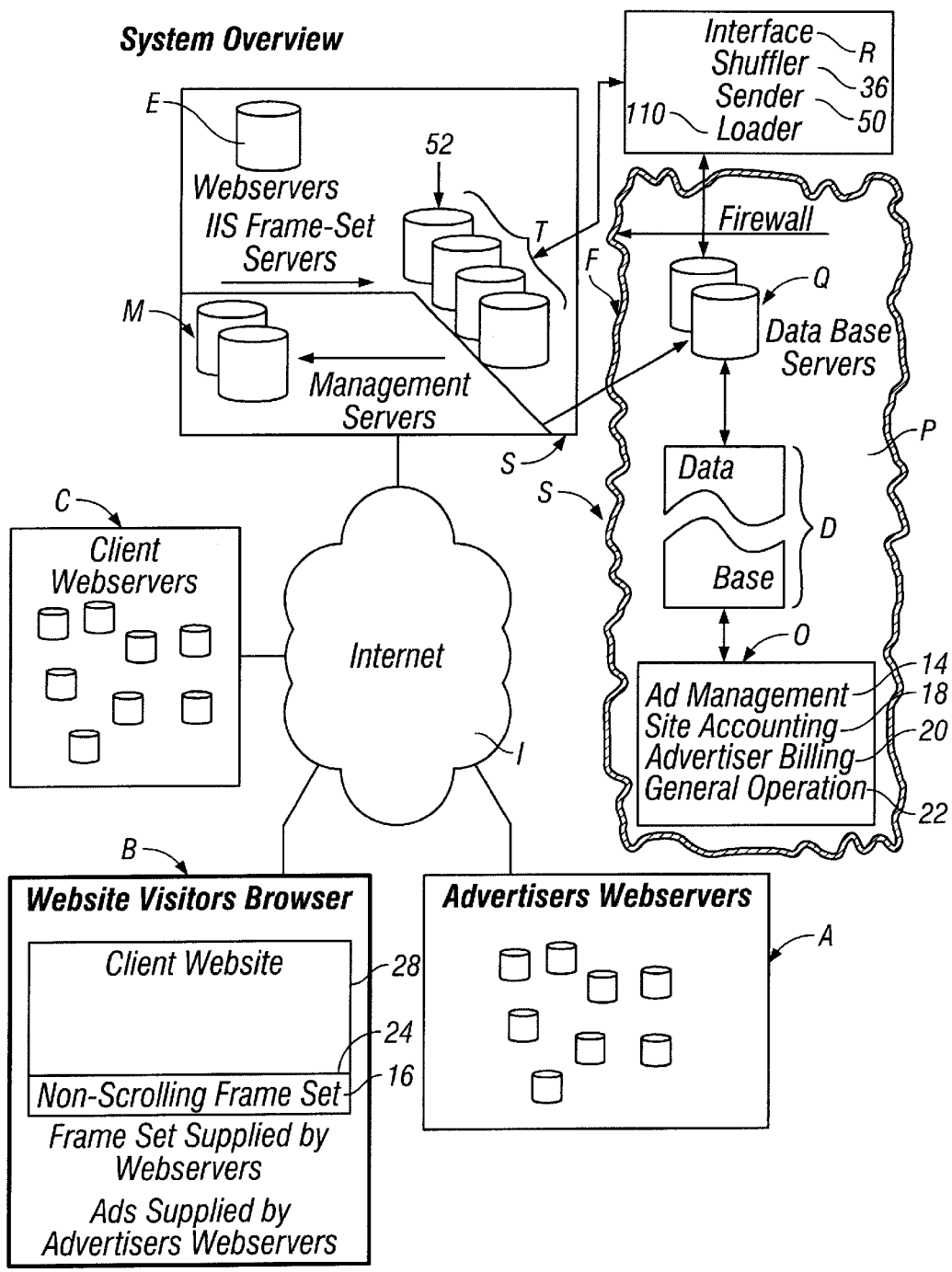
FIG. 1 is a schematic of the Internet illustrating the inquiring browser, the customer website, the central advertising controller, and the advertising server with the browser depiction altered to indicate assembly of the play list.

Referring to FIG. 1, the components required for the practice of this invention are schematically illustrated with respect to their connection to the internet I.

System controller S includes three major component parts; webservers W, management servers M, and central processor P. Central processor P is isolated from Internet I by firewall F. Within firewall F this system includes database servers Q which execute and maintain data base D, a running "real time" record which has output O.

Management servers M communicate directly to data base D. Accordingly, these management servers M require a high level of authentication; access is not permitted on a casual basis.

It is convenient, if not required, to provide interface computers R. In what follows we will describe the action of programs entitled shuffler 36, sender 50, and loader 110. These programs all operate on interface computers R and function to cyclically process data as hereafter described. The described feedback loop operation of these programs enables data base D, and output O of data base servers Q to be left to the described management chores including ad management 14, site accounting 18, advertising billing 20, and general system operation 22.

Utilizing data base D, database servers Q provide first ad management 14. This ad management controls the particular ad content 16 displayed on any browser B. Outside administration by customers of ad content 16 is permitted through management servers M, which directly communication with data base D.

Second, site accounting 18 is provided. Site accounting 18 is a record of total time interval of the many ad contents 16 that may be displayed through client webservers C. This record may be used to compensate each of the client webservers C for the total time of ad display to particular browsers B.

Third, data base D is used for advertising billing 20. As will hereafter become apparent, the identity of the ad content displayed and the identity of the particular browser B is maintained in a record. This record has the ads available for display, those ads already displayed, and the identifier of the particular browser B on which the ads were displayed. Utilizing this record, advertisers can be billed for the services that the system renders.

Fourth, data base D is used for general system operation 22. This general system operation can include alteration of the number of times that ad content 16 is displayed, the classification of ad content 16, the time of day of display of ad content 16 and virtually any desired parameter which an advertiser would prefer to control.

System controller S also includes three sets of differing servers connected to internet I. First, there are frame set servers T. Frame set servers T are interactively called when a browser B calls on a client webservers C for the first time. The inquiring browser B is interrogated for the presence of a site banner 24. Lacking the presence of site banner 24, the inquiring browser B is diverted to frame set servers T and site banner 24 installed on the browser B.

As will be made clear hereafter, in addition to the installation of site banner 24, two other important code components are delivered to an inquiring browser B. First, unsorted arrays of play lists 57 are delivered as will be set forth with respect to FIG. 4 that follows. Second, sufficient code will be delivered to browser B to enable sorting of the unsorted arrays of play lists 57. Thus, in the explanation that follows, the reader will understand that inquiring browser B not only fetches and displays ads from the Internet I, but additionally sorts arrays of Internet addresses and effectively determines for itself the ads to be played.

Once this interrogation has taken place and the three groups of code are delivered to the inquiring browser B, browser B is returned to the particular client webserver C on which call was first made, the interrogation repeated, site banner 24 found, and display of ad content 16 begun with a so-called default ad content 16' from the particular client webserver C.

Client webservers C are the territory in which the ad content 16 is displayed to the browsers B at the non-scrolling site banner 24. In the commercial operation of this system, space for site banner 24 is "rented" from the operator of each client webserver C. By having system controller S control the ad content 16 which is displayed within site banner 24, the ad management of this invention occurs.

What constitutes "renting" of the space from client webserver C should be made clear. First, no space is ever defined on the webpage of client webserver C for the display of an ad. Instead, the owner of the client webserver C understands that all inquiring browsers B will have overlaid on their display site banner 24. In this site banner 24 ad material will appear.

One telltale of this arrangement is that although the operator of browser B can scroll the webpage, site banner 24 with its ad remains in place.

Only one browser B is identified in FIG. 1. The reader will understand that many (in the hundreds of thousands) such browsers B use the system. As will hereafter become apparent, it is particularly important to use the distributed intelligence of browser B to do as much of the "work" for obtaining, sorting, timing, reporting, and retrieving ad content 16 displayed within site banner 24. Thus it is the main purpose of system controller S to control browser B in the obtaining, sorting, timing, reporting, and retrieving of the ad content 16 so that band width at system controller S is appropriately narrowed.

Screen 28 of browser B is shown schematically. Once non-scrolling site banner 24 is installed, default ad content 16' is first displayed. As will hereafter be discussed in detail, browser B is provided with a group of ad addresses to be played as well as software to sort the ad addresses for play. The provided group of ads are further supplied with software enabling the browsers B to sort there own "play list." Report of the ads either being played or "clicked" is made through so-called query strings. These query strings are Internet addressed reports that contain the URL address, the server file number, a command for the serial recording of data, and finally the data to be recorded. All this will be set forth in the specification that follows.

It will be understood that most browsers are "cookie enabled." That is once browsers B are diverted to frame set servers T, in addition to the three components of code delivered to browsers B, a "cookie" is implanted in the browser B. It will be understood that we encrypt and load this "cookie" with records of ads played. When browser B sorts unsorted arrays of play lists 57, a comparison is made between the sorted play list and the "ads played" record of the cookie. Ads that have been previously played at that browser B are omitted from play.

Finally, the reader will note that advertising webservers A are shown. These sites contain ad content 16 with appropriate timers. It goes without saying that advertising webservers A can be webservers owned by the advertisers themselves. Further, the ad content 16 dispensed by these advertising webservers A can be altered by the advertiser at will—so long as they conform to the format of this advertising system. Thus it is possible to give the advertiser direct control of ad content and ad duration used with this system.

Figure 2:
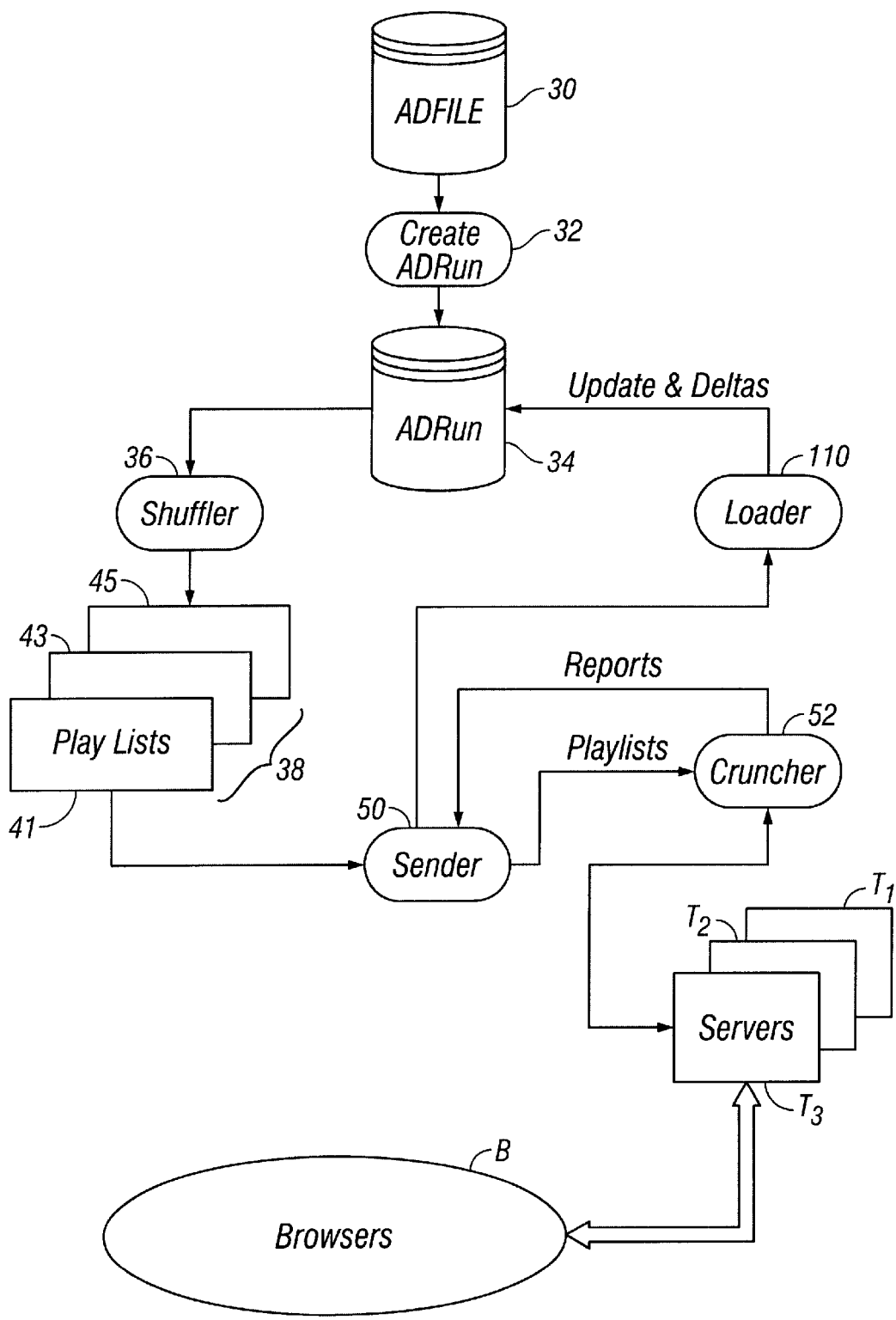
FIG. 2 is a schematic of the advertising central controller altered to indicate the presence of a feedback loop for arranging the order of ads to be played together with a system of delivery between illustrated servers and inquiring browsers.

Having set forth the components utilized with this invention, a description of the endless feedback loop for weighting ads according to their play in the system will be set forth with respect to FIG. 2. Thereafter, a typical call of browser B on client webserver C will be diagrammed with respect to FIG. 3. With respect to FIG. 4, the fetching of groups of ad addresses for run at the browser B calling on the client webserver C will be set forth. In this it will be noted that browser B only receives groups of ads, which ads must be subsequently sorted at the browser B. With respect to FIG. 5, a reporting query string will be described. In FIG. 6, a data base compatible report assembled by the loader 110 will be set forth.

Referring to FIG. 2, the database of all ad files 30 is shown. This record contains the information related to all possible ads for all possible websites. Further, this file contains all possible parameters needed for the ad. Exemplary of these parameters are:

1. Internet address of ad banner;
2. Category of Ad
    a. (A–E)A [highest]–E[lowest],
    b. Run of Network, or
    c. Billboard Exchange.
3. Ad specific to any site.
4. Length of ad display.
5. Target Number of Runs.
6. Categories of Websites on which Ad Can Run.

7. Times of Ad Runs.
   a. Days of Month,
   b. Days of Week;
   c. Hours of Day.
8. Ad part of Campaign.
9. Ad part of Group.
10. Index of ad (related to charge for ad).
11. Accumulated of ad (weight given to ad for previous runs).

Once each day, a so-called ad run 34 is created. This is created by passing through the entire database of all ad files 30 and selecting those ads which are eligible for run on any given day. Using the above enumerated record, presuming that an ad has not exceeded its targeted number of runs, meets the criteria of days of the month, days of the week, and the campaign and group of which it is a part are targeted for display at browsers B, the ad will be passed to ad run 34.

It will be understood that ads in ad run 34 are then passed to shuffler 36 running on interface computers R. It is the job of shuffler 36 to develop play lists 38. The play lists are placed in groups. These groups are compatible to the classifications of client webserver's C. It is believed that an example of this compatibility will suffice.

Take the example of a client webserver C related to sports—such as wrestling. It can be determined between the client website and the advertising system administration as to what kind of ads will best run on client webserver C related to sports. For example health food play list 41, sports clothing play list 43, and sport shoe play list 45 could all be candidates for a client webserver C which relates to wrestling. Accordingly, it is the job of shuffler 36 to sort such lists in corresponding categories.

Figure 4:
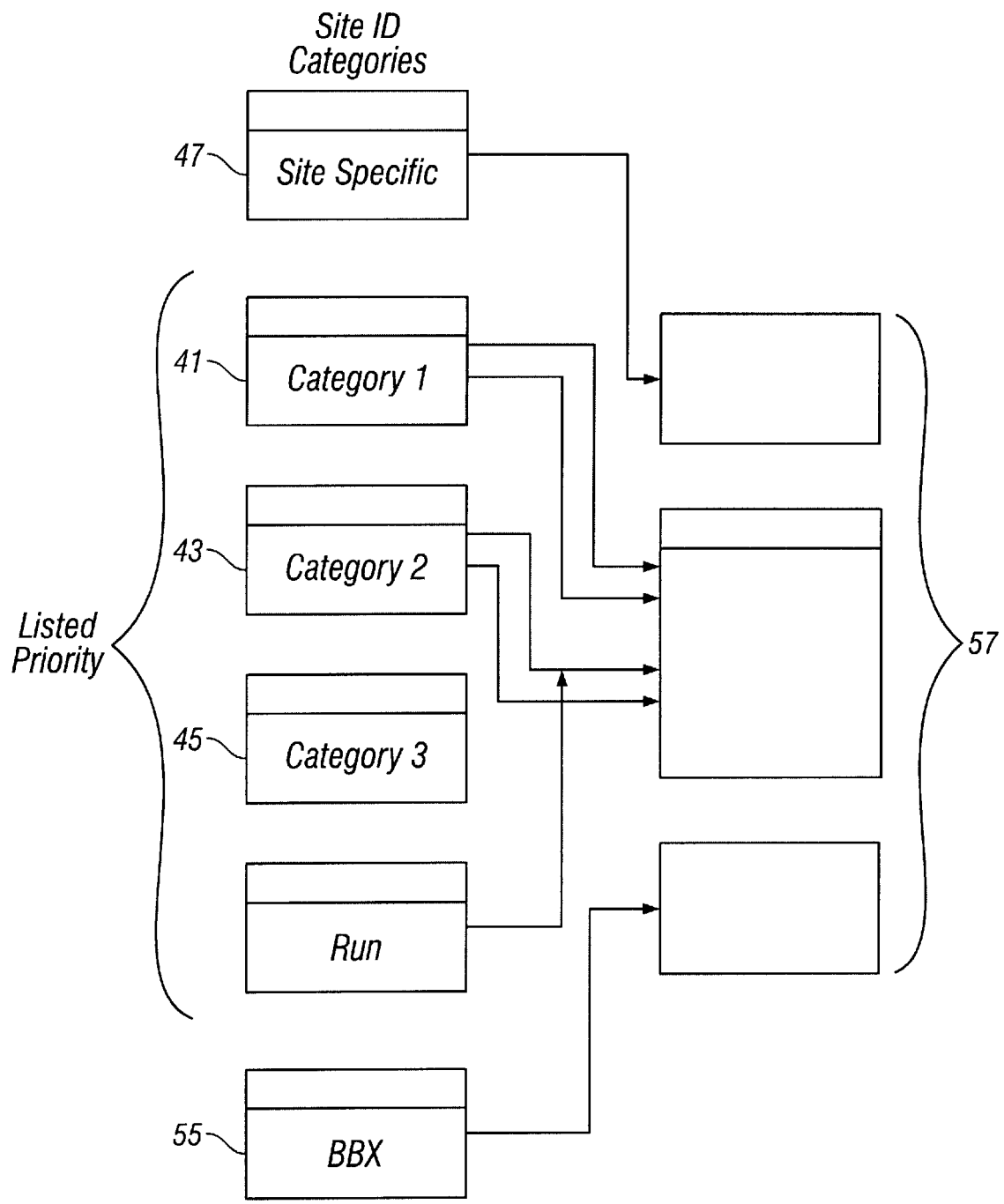
FIG. 4 is a schematic illustrating arrays of ads being collected from the servers for the central controller, it being understood that sorting of all the ads into an ordered play list must occur after assembly of the ads from the servers of the central controller.

Referring to FIG. 4, shuffler 36 will use the following criteria in ordering the ads.

First, play lists 38 will be placed into discrete categories. By way of the above example, health food play list 41, sports clothing play list 43, and sport shoe play list 45 are examples of the categories.

Second, play lists 38 in each of the categories will have to be ordered. This is illustrated with respect to FIG. 4. Ordering will include first site specific ads 47. Thereafter, and within each health food play list 41, sports clothing play list 43, and sport shoe play list 45, ordering will occur by assigned category A–E. All category A ads will play before category B ads. Similarly all category B ads will play before category C ads. Thus, this much of the ordering is relatively simple.

Third, and once the categories are sorted by assigned priority, they now must be weighted for order in terms of accumulated ad Δ. For purposes of the present explanation, it will be assumed that all ads coming from ad run 34 have an accumulated Δ. When the full cycle illustrated in FIG. 2 is explained to the reader, the origination of these weighted Δ's will be understood.

With the respective play lists 38 all ordered in their respective categories 41, 43, 45, these files are passed to sender 50. It is the job of sender 50 to forward the ordered play lists 38 to cruncher 52. Cruncher 52 then forwards play lists 38 to frame set servers T1, T2, T3 etc.

It will be understood that literally thousands of ads may be sorted and otherwise ready for play. It is not practicable to forward play lists 38 containing so many ad addresses to frame set servers T. Accordingly, only ads which are at the top of the play lists 38 will be forwarded to frame set servers T.

Stopping here, it is important to understand with respect to FIG. 4, the play lists 38 that are assembled at frame set servers T for delivery to an inquiring browser B. It will be understood, that sorted groups of ads are present, typically in the form of ad addresses placed in an array. The ads forwarded will be from several ad categories that have previously been determined as applicable to the site, here a wrestling site. Those ads are health food play list 41, sports clothing play list 43, and sport shoe play list 45. Additionally, site specific ads 47 will be forwarded. For an example of a site specific ad, considered the case of an upcoming wrestling event. An ad telling where and how tickets for such an event can be obtained would be an ideal site specific ad.

Finally, and assigned the lowest possible category are so-called billboard exchange ads 55. These are ads related to the advertising system central controller's other customer websites. These ads are designed to run in an endless loop, once all other ads have run. By way of example, let us presume that the wrestling website contains a game, which game can be played over the Internet I. While an inquiring browser B has its user play such a game, it is quite possible that all ads will have played—an interval of 30 minutes or more—and the particular site banner 24 would otherwise be empty. At that time billboard exchange ads 55 will run.

Viewing FIGS. 2 and 4 together, it is important to understand exactly what will be delivered to browser B calling on frame set servers T. First, alteration to browser B will be effected to install site banner 24. Second, groups of unordered ad addresses for play will be forwarded. These will included say the top four ads relating to health food play list 41, the top four ads relating to sports clothing play list 43, and the top four ads relating to sport shoe play list 45. These groups of ads will be in no particular order for play; it will be the job of browser B to sort the ads for play during running of an initial ad always starting a browser session. Most important to understand, is that any sorting occurring at advertising system central controller S is not complete. The unsorted arrays of play lists 57 are shown in FIG. 4. Sorting at browser B is required.

Figure 3:
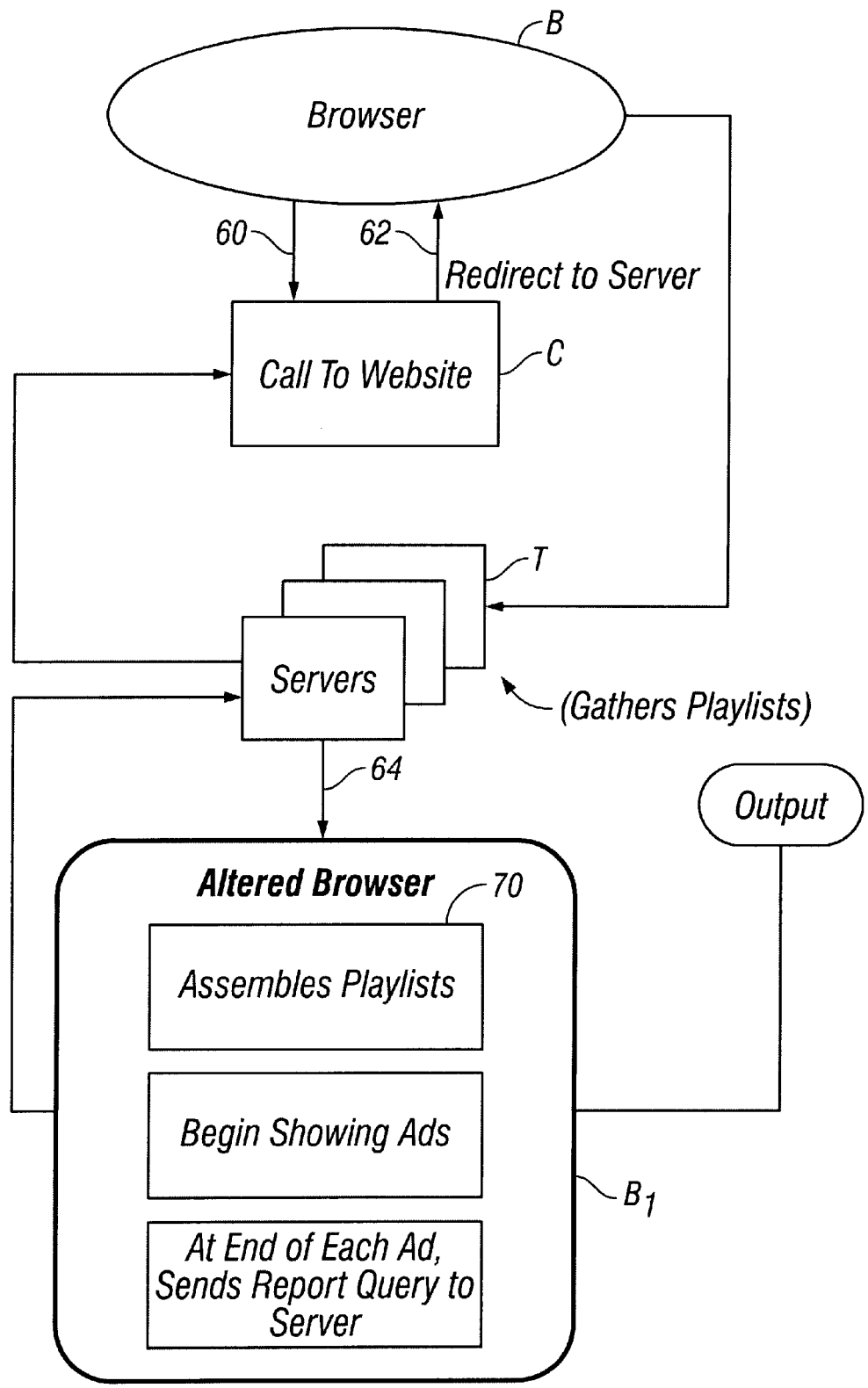
FIG. 3 is a schematic of an inquiring browser calling on a website with illustrated diversion to the servers to an advertising system central controller where the browser is modified to assemble play lists, show retrieved ads, and report ad disposition including timing out and clicking on ads.

Turning to FIG. 3, the cycle of browser B calling on a client webserver C can be understood. First, presume that browser B calls on wrestling client webserver C at initial call 60. Browser B acquires from client webserver C immediate redirection to frame set servers T. Browser B then is supplied at browser alteration input 64 with three classes of software on line. First, and written in HTML, there is the required software to alter browser B to altered browser B1 having site banner 24 installed. An example of this forwarded software is included as Exhibit A.

We have found a surprising advantage related to site banner 24. Specifically, when a website is contacted, the various webpages are scrolled under site banner 24. Thus the site banner 24 remains in place while the webpages change around it. This has resulted in a higher "click" rate for the advertiser. At the time of the writing of this Application, we have conducted one survey where the click rate reached as high as 4%. While portions of this click rate depend upon the "creative" content of the ad displayed and the product or service sold, we have observed that this click rate is in excess of any click rate so far observed relating to webpage banner advertising.

Second, an example of software written in Java Script Code is attached hereto as Exhibit B. This software is forwarded to the browser over the Internet and is executed at the browser.

Third, software is included herewith as Exhibit C, also written in Java Script Code, which defines the array of ads to be played by the browser.

Finally, a sample array utilizing actual Internet addresses is shown as Exhibit D. This array is transmitted to the browser B. to go out on the Internet and fetch the actual ads played.

With regard to the software, it is possible to modify this software to enable the browser to load into memory the content of the next in order ad to be played while the current ad "times out." Since we require an ad to "time out" before an ad is reported as played, the "pull" of this ad information from an ad server does not result in ad billing.

It is to be further noted that we have found background software loading to have another unexpected advantage. Specifically, it has been the practice of the industry to limit the information of the ad placed in the banner to a specific number of bytes—in the order of 7,500 K. Where we pre-load an ad to be played in the available memory of an inquiring browser while a currently being played ad times out, the interval of time over which load of the ad to the inquiring browser can occur as a practical matter increases. We have found that during this time out interval, banner ads exceeding the present industry standard are easily transmitted without interfering with the required webpage byte flow. Currently, our system can tolerate creative byte information in the range of 30,000 K.

Taking the case of altered browser B1, what occurs next is relatively easy to understand. Altered browser B1 assembles unsorted arrays of play lists 57 into ordered browser play lists 70. After play of an initial ad, the ordered browser play lists 70 are then played. First, a comparison is made related to ads lodged with the computer cookie that have already been played at that discrete browser B to the maximum number of plays permitted in play list. These ads will not be further played. Ads that have not been played at the discrete browser B will be the only ads played.

Let us now presume that a site specific ad 47 for an upcoming wrestling event is the first ad run. Further, and due to the importance of this ad, it is provided with a 40 second run time and the URL diversion address of the wrestling promoter—where tickets may be ordered. Two events can clearly occur.

First, the operator of the browser can "click" on the ad. With such clicking, immediate diversion of the inquiring browser B occurs to the promoter's website, presumably for ticket sales.

Second, let us presume that the operator of the browser is not interested in attending that particular event. In this case, the ad will "time out", and a report of a "time out will be made. This report is schematically illustrated in FIG. 5.

Figure 5:
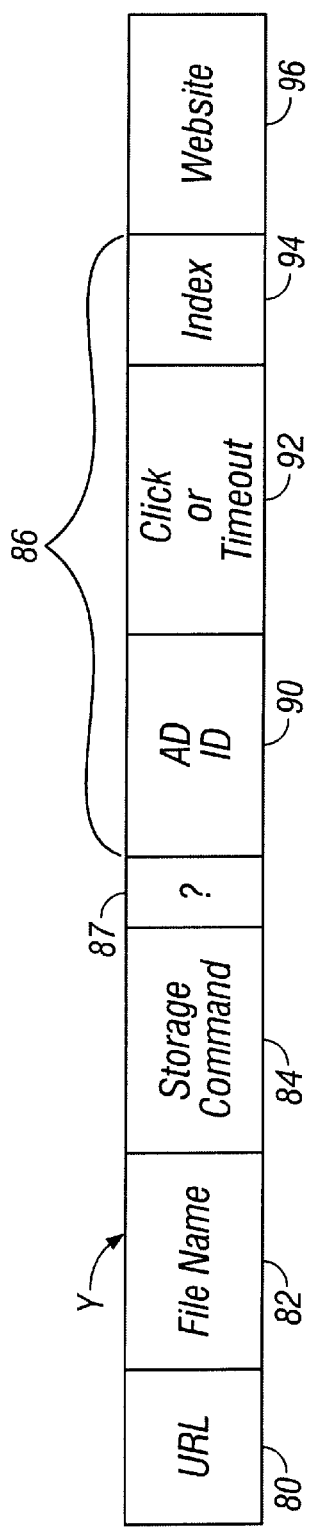
FIG. 5 is a diagram of a reporting "query string" which is routed through the Internet to the advertising system central controller and typically serially stored in memory of the webservers of the advertising system central controller.
Figure 6:
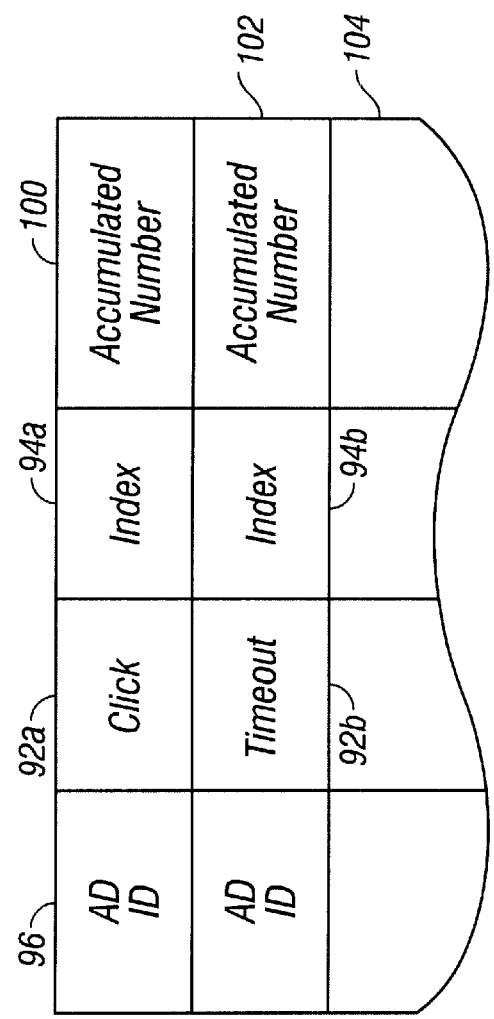
FIG. 6 is a "digestible" report prepared at the webservers of the advertising system central controller; and, FIGS. 7*a*, 7*b*, 7*c*, 7*d*, 7*e*, and 7*f* are tables illustrating the "weighting" of ads of the same category for play, the weighting scheme here illustrated and occurring at three 5 minute intervals to a simplified array of only four ads.

Referring to FIG. 5, query string Y is illustrated. It first includes the URL address 80 of frame set servers T. Second, it includes the particular destination file 82 where the information in the report is to be serially stored at frame set servers T. Finally, it includes a command that the server upon receipt of the string store data at storage command 84.

It will be noted that data field 86 is separated by ? 87. Data field 86 includes ad identification 90, click or time out designation 92, index 94 and website identification 96. As will hereafter be understood, index 94 relates to system pricing for the time out or click on the ad. For example, it is common to determine that a "click" is more valuable than a "time out."

Returning to FIGS. 1 and 2, two important observations can be made about query string Y. First, the time interval in which query string Y traverses Internet I is completely unimportant. Speed of communication and recordation at frame set servers T is not of concern. The reports can come in casually and be serially recorded in storage media in frame set servers T.

Second, the serial storage of query strings Y at frame set servers T will form an audit trail. Should subsequent processing and billing of the advertising system central controller S ever be questioned, such billing may be regenerated from the serial data stream recorded at all system frame set servers T.

Besides the delivery of the unsorted arrays of play lists 57, cruncher 52 has a second task. That task is to serially examine the specified particular destination file 82 and to form from the serial data a digestible report of ad play for the sender 50. The format of such a report, typically formed into an array, is illustrated with respect to FIG. 6.

Referring to FIG. 6 is an array report compiled by cruncher 52. This report is compiled by serially examine the particular destination file 82 in frame set servers T. It includes website identification 96, report of click 92$a$, report of timeout 92$b$, index for click 94$a$, index for click 94$b$, and finally accumulated number of each event 100, 102, 104. At the reader will understand, this report will be extensive and run through many possible ads. Only one ad broken into the click and timeout category is here shown.

When cruncher 52 has compile the reports illustrated in FIG. 6, return of reports occurs to sender 50. Sender 50 then in turn forwards the report to loader 110. It is at loader 110 that ads are weighted for play. The weighting of the ads for play is illustrated with respect to FIGS. 7A–7F.

For the purpose of this example, we assume that all ads are of the same category, for example from the health food play list 41. Further, we presume that the purchased category of ads are all the same, they are "A" ads. It will be understood that all the health food category "A" ads will be played out according to the following weighted Δ categories before any "B" ads will be considered.

Having made these assumptions, first, it is important to note the time intervals of FIGS. 7A–7F. FIG. 7A is at time=t+0. FIGS. 7B and 7C are at time=t+5. FIGS. 7D and 7E are at time=t+10. Finally, FIG. 7F is at time=t+15.

Second, it is important to note that FIGS. 7A, 7C, and 7E are all sorted for their respective Δ's. FIGS. 7B, 7D, and 7F are not sorted for their respective Δ's. They are all shown the instant before a sort occurs.

Third, ads will play in the system of this design in accordance with the order in which they initially appear. Ads first in the list of ads will play first. Ads later in the list will play second. Remembering this much, and assuming that browsers B visit client webservers C for random periods of time, ad first in the list for play have a much better chance of play than ads second in the list for play. Further, ad second in the list for play have a much better chance of play than ads third in the list for play. This principle is applicable to the list of ads, no matter how long it happens to be.

Fourth, and taking the case of the above described time intervals, it is assumed that the first order ad will play approximately 5,000 times, the second order ad 3,000 times, the third order ad 1,000 times, and the last order ad 500 times.

Fifth, for purposes of convenience, we assume that the desired number of plays is always the same. Here we choose 10,000 plays. The reader will understand that in actual practice this almost will never be the case. However, the simplification enables clearer understanding of the principles involved.

Sixth, each ad is given an Ad ID, a number of desired plays, an accumulated number of actual plays, and a weighted Δ.

Seventh, the computation of the weighted Δ is easily understood. The actual number of plays is divided by the desired number of plays. Thus initially, the weighted delta for all ads is zero (0).

Eighth, sorting occurs with the ad having Δ=0 given the first order in the list.

Most importantly, and when a new ad is introduced to the system, weighting on Δ alone will always produce a 0 and bubbling of that ad immediately to the top of the list will occur. In another sense, the new customer will see his ad with relative swiftness, provided the customer has purchased an ad having the requisite category—which is assumed in this example to be an "A" category ad.

Attention should now be turned to FIG. 7A. Ads in categories 1–4 are shown upon initialization of the system. Since we assume that no plays of the health food play list 41, assigned category "A" ads has occurred, all Δ's are zero (0). However, it is not avoidable that the ads have an order. Here that order has been arbitrarily assigned by the numerical value of the Ad ID. Ad 1 is first, ad 4 is fourth. This is the state of the system at time=0 illustrated in FIG. 7A.

In FIG. 7B, time=t=5 (say for purposes of the example, 5 minutes) is illustrated. Ad 1, being first in the list has played 5,000 times, Ad 2 second 3,000 times, Ad 3 third 1,000 times, and Ad 4 fourth 500 times. Accordingly, the weight Δ are Ad 1 0.5, Ad 2 0.3, Ad 3 0.1, and Ad 4 0.05.

The reader will understand that the assemblage of the information occurs from cruncher 52 transmitting to sender 50. Sender 50 in turn transmits to loader 110. Loader 110 running in interface computers R assembles the tabular information illustrated in FIG. 7B. Further, this tabular information is transmitted from loader 110, updating ad run 34, with the information then passed to shuffler 36. It is at shuffler 36 the sort illustrated at FIG. 7C occurs.

Referring to FIG. 7C at shuffler 36, the results of the sort precisely reverses the order of ad play. Ad 4 is first, Ad 1 is last. However, transitioning to FIG. 7D, and using the same number of assumed plays for the time=t+10, the weighted A change differently. At loader 110, Ad 4 and Ad 1 have an accumulated Δ of 0.55 while Ad 3 and Ad 2 have an accumulated Δ of 0.4. When the data progresses from loader 110, through ad run 34, to shuffler 36, ordering of the data will result in the array of FIG. 7E.

Finally, and at time t=15, the weighted Δ's are again shown. It will be seen that Ad 3 has 0.9, Ad 2 0.7, Ad 4 0.65, and Ad 1 0.6. Diversion of the weighted Δ rapidly occurs. The next sort (not shown) will order the ads 1, 4, 2, and 3.

The reader will understand that the diagrams illustrated are an extraordinarily over simplified example. Further, it will be remembered that each ad list of a category such as health food play list 41 assigned category "A" ads can include from 1 to 100 such ads. Further, it will be remember that only the top four ads from these lists were even considered for play. Thus, we choose to describe the automated ordering obtained by the described play as "bubbling" of ads to the top for play. Further, those familiar with computers will understand that the illustrated computation and transmission of the array, although some what difficult for the reader to follow, is precisely designed for execution on a computer.

Having generally described this system, some important principles can be set forth.

First, by ordering the play list as described, we adjust the frequency of desired play. Where an ad is placed to the head of the play list, its statistical changes of having play greatly exceed ads played later in the list. Therefore, by changing the order of the ad address in a list, we adjust the frequency of ad play.

Secondly, we "weight" ad addresses in accordance with their approach toward a desired number of total plays. As each ad approaches its "weighted" limit, the order of the ad address in the list is moved toward the end of the list. This limits the likelihood that the ad will be played.

Third, we do not continually adjust ads in order of play. Instead, we periodically adjust ads order of play. We find this sufficient for managing a large number of such ads and controlling their play toward desired and targeted numbers of discrete display at browsers.

Fourth, using our weighted play system, we dispatch to inquiring browsers B unsorted arrays of play lists 57. We allow the final order of the play lists to occur at the browsers B; the advertising system central controller S does not have to individual compute each play list.

Fifth, by establishing an endless feedback loop as illustrated in FIG. 2, we establish a computer net work in the advertising system central controller S which in conjunction with the Internet I at large manages ad play. By continually cycling ad addresses in groups (A–E), matching particular groups to corresponding websites, and weighting the ads within any particular group in accordance with the desired play, we assure ad play management. This ad play management is not computationally intensive on the advertising system central controller S.

It will be understood that the disclosed system is capable of modification.

What is claimed is:

1. A process of banner display on an inquiring browser viewing a website over an Internet comprising the steps of:

inquiring from the inquiring browser to a website authorizing display of banner advertising;

providing an advertising system central controller having a plurality of groups of Internet ad addresses of each ad and classification information related to a frequency of desired ad play of each ad and reported play of each ad;

sorting at the advertising system central controller the groups of Internet ad addresses relative to the classification information related to a frequency of desired ad play of each ad and reported play of each ad to obtain a plurality of sorted groups of Internet ad addresses;

diverting the inquiring browser to the advertising system central controller to obtain at least a portion of the plurality of groups of Internet ad addresses of each ad;

displaying at the inquiring browser a frame set for location of an advertising banner; and, having the inquiring browser fetch and display at the frame set at least the first ad from at least one of the plurality of groups of Internet ad addresses.

2. The process of banner display on an inquiring browser viewing a website over an Internet according to claim 1 and comprising the further steps of:

providing the inquiring browser with code to enable sorting of the group of Internet ad addresses relative to the classification information related to the frequency of desired ad play at the inquiring browser; and, sorting at the inquiring browser the Internet ad addresses to form a sequential play list of ad addresses for the inquiring browser.

3. The process of banner display on an inquiring browser viewing a website over an Internet according to claim 2 and comprising the further steps of:

the sorted Internet ad addresses of each ad at the inquiring browser includes an assigned category ordering ad play.

4. The process of banner display on an inquiring browser viewing a website over an Internet according to claim 1 and comprising the further steps of:

comparing the group of Internet ad addresses of each ad to Internet ad addresses of previously played ads maintained in the inquiring browser; and, preventing repeated display of previously played ads in the inquiring browser.

5. The process of banner display on an inquiring browser viewing a website over an Internet according to claim 4 and comprising the further steps of:

the preventing repeated display of previously played ads in the inquiring browser includes preventing repeated display of previously played ads in the inquiring browser against a predetermined plurality of previously played ads.

6. The process of banner display on an inquiring browser viewing a website over an Internet according to claim 1 and comprising the further steps of:

the reported play of each ad includes information related to a request for ad play.

7. The process of banner display on an inquiring browser viewing a website over an Internet according to claim 1 and comprising the further steps of:

the reported play of each ad includes information related to actual ad play.

8. The process of banner display on an inquiring browser viewing a website over an Internet according to claim 1 and comprising the further steps of:

the sorted Internet ad addresses of each ad at the inquiring browser includes information related to ad play at browser other than the inquiring browser.

9. The process of banner display on an inquiring browser viewing a website over an Internet according to claim 1 and comprising the further steps of:

displaying at the inquiring browser a frame set for location of an advertising banner includes
having the webpage define the frame set for location of the advertising banner.

10. The process of banner display on an inquiring browser viewing a website over an Internet according to claim 1 and comprising the further steps of:

displaying at the inquiring browser a frame set for location of an advertising banner includes
having the advertising system central controller define on the browser the frame set for location of an advertising banner.

11. The process of banner display on an inquiring browser viewing a website over an Internet according to claim 1 and comprising the further steps of:

the reported play of each ad includes information related to a request for ad play.

12. In an Internet ad system having:

a website displaying webpages permitting a banner with advertising;

at least one inquiring browser for viewing webpages from the website;

at least one ad server for providing a banner with advertising;

an advertising system central controller having Internet ad addresses for the at least one inquiring browser to enable retrieval of the banner with advertising over the Internet; and, means for providing from the advertising system central controller to the inquiring browser the Internet ad address of the at least one ad server to enable the at least one inquiring browser to fetch and display the banner with advertising on a webpage of the website;

a process of a providing a group of Internet ad addresses with classification information enabling ordering of ad play at one inquiring browser relative to frequency of ad play at other inquiring browsers, the process comprising the steps of:

providing the advertising system central controller having a group of Internet ad addresses to be viewed;

sending the Internet ad addresses from the advertising system central controller upon request to the inquiring browsers;

having the inquiring browsers fetch and play the banner with advertising from the at least one ad server;

sending reports of play to the advertising system central controller;

lodging with at least one ad address of the ad played a record of the ad play at the advertising system central controller;

sorting the at least one ad address having the record of ad play with other ad addresses to obtain a sorted group of ad addresses related to the frequency of ad play; and, providing at least a portion of the sorted group of ad address to inquiring browsers at the advertising system central controller.

13. The process of a providing a group of Internet ad addresses with classification information enabling ordering of ad play at one inquiring browser relative to frequency of ad play at other inquiring browsers according to claim 12 and including:

the record of the ad play at the advertising system central controller includes a request for ad play.

14. The process of a providing a group of Internet ad addresses with classification information enabling ordering of ad play at one inquiring browser relative to frequency of ad play at other inquiring browsers according to claim 12 and including:

the record of the ad play at the advertising system central controller includes a report of actual ad play.

15. The process of a providing a group of Internet ad addresses with classification information enabling ordering of ad play at one inquiring browser relative to frequency of ad play at other inquiring browsers according to claim 12 and including:

the at least one browser places a frame for the display of the banner with advertising on the browser.

16. The process of a providing a group of Internet ad addresses with classification information enabling ordering of ad play at one inquiring browser relative to frequency of ad play at other inquiring browsers according to claim 12 and including:

the at least one browser receives a frame for the display of the banner with advertising from the webpage.

17. The process of a providing a group of Internet ad addresses with classification information enabling ordering of ad play at one inquiring browser relative to frequency of ad play at other inquiring browsers according to claim 12 and including:

the sending reports of play from the inquiring browser to the advertising system central controller includes a query string having an Internet address, a file designation in the system controller, a command designating recording of a record of data, identification of the ad, and a record of the play of the ad.

18. In an Internet ad system having:

a website displaying webpages permitting banner advertising;

at least one inquiring browser for viewing webpages from the website;

at least one ad server for providing a banner with advertising;

an advertising system central controller having Internet ad addresses for the at least one inquiring browser to enable retrieval of the banner with advertising over the Internet; and, means from providing from the advertising system central controller to the inquiring browser the Internet ad address of the at least one ad server to enable the at least one inquiring browser to fetch and display the banner with advertising on a webpage of the website;

a process of accumulating reports of ad play comprising the steps of:

provideing the advertising system central controller with a group of Internet ad addresses to be sequentially viewed;

sending the Internet ad addresses of ads to be played from the advertising system central controller upon request to the inquiring browsers;

having the inquiring browsers using the Internet ad addresses of ads to be played fetch and play the banner with advertising from the at least one ad server;

sending reports of play from the inquiring browser to the advertising system central controller, the reports of play including an Internet address of the advertising system central controller, a file designation in the advertising system central controller, a command to record the report of play in the advertising system central controller, and a record designating the ad play;

logging at least the record designating ad play.

19. The process of accumulating reports of ad play according to claim 18 comprising the steps of the logging step includes:

serially recording the reports of play at the advertising system central controller; and, polling serially the reports of play to build a report including the record of ad play, and a number of times that the ad has been played.

20. The process of accumulating reports of ad play according to claim 18 comprising the steps of:

the logging of reports of play from the inquiring browser to the advertising system central controller occurs when the ad begins to play at the inquiring browser.

21. The process of accumulating reports of ad play according to claim 18 comprising the steps of:

the logging of reports of play from the inquiring browser to the advertising system central controller occurs when the ad finishes play at the inquiring browser.

22. The process of accumulating reports of ad play according to claim 18 comprising the steps of:

the sending the Internet ad addresses from the advertising system central controller upon request to the inquiring browsers occurs with one address being sent.

23. The process of accumulating reports of ad play according to claim 18 comprising the steps of:

the sending the Internet ad addresses from the advertising system central controller upon request to the inquiring browsers occurs with a group of ad addresses being sent.

24. The process of accumulating reports of ad play according to claim 18 comprising the steps of:

the logging of reports of ad play includes reporting a click.

25. The process of accumulating reports of ad play according to claim 18 comprising the steps of:

delivering after the polling serially the reports of play step the record designating the fact of ad play, and a number of times that the ad has been played to a central record in the advertising system central controller for accumulation.

26. In an Internet ad system having:

a website displaying webpages permitting banner advertising;

at least one inquiring browser for viewing webpages from the website;

at least one ad server for providing a banner with advertising;

an advertising system central controller having Internet ad addresses for the at least one inquiring browser to enable retrieval of the banner with advertising over the Internet; and, means from providing from the advertising system central controller to the inquiring browser the Internet ad address of the at least one ad server to enable the at least one inquiring browser to fetch and display the banner with advertising on a webpage of the website;

a process of accumulating reports of ad play comprising the steps of:

providing the advertising system central controller with a group of Internet ad addresses to be sequentially viewed;

sending the Internet ad addresses from the advertising system central controller upon request to the inquiring browsers;

having the inquiring browsers fetch and play the banner with advertising from the at least one ad server;

sending reports of play from the inquiring browser to the advertising system central controller, the reports including an Internet address of the advertising system central controller, a command to record the report in the advertising system general controller, and the website on which the ad was played;

batching the reports of play to build a report including the website on which the ads have been played and a number of times that ads have been played on the website.

27. The process of accumulating reports of ad play according to claim 26 wherein the batching includes the steps of:

serially recording the reports of play at the advertising system central controller; and, polling serially the reports of play to build a report including the website on which the ads have been played and a number of times that ads have been played on the website.

28. The process of accumulating reports of ad play according to claim 26 comprising the steps of:

the sending reports of play from the inquiring browser to the advertising system central controller includes sending the reports at the beginning of ad play.

29. The process of accumulating reports of ad play according to claim 26 comprising the steps of:

the sending reports of play from the inquiring browser to the advertising system central controller includes sending the reports at the end of ad play.

30. The process of accumulating reports of ad play according to claim 26 includes the step of:

reporting the click on the banner of an ad being played.

31. In an Internet ad system having:
a website displaying webpages permitting banner advertising;
at least one inquiring browser for viewing webpages from the website;
at least one ad server for providing a banner with advertising;
an advertising system central controller having Internet ad addresses for the at least one inquiring browser to enable retrieval of the banner with advertising over the Internet; and,
means from providing from the advertising system central controller to the inquiring browser the Internet ad address of the at least one ad server to enable the at least one inquiring browser to fetch and display the banner with advertising on a webpage of the website;
a process of playing banners with advertising to meet quotas of play comprising the steps of:
providing to the advertising system central controller a plurality of ad addresses of ads to be played and a target number of times of ad play for each discrete ad;
having a plurality of inquiring browsers call on a website permitting banner advertising;
diverting the inquiring browsers to the advertising system central controller to receive the plurality of ad addresses of ads to be played;
ordering a list of ad addresses of ads to be played with a least played ad relative to a target number of times of ad play first in the list of ad addresses of ads to be played and ads more frequently played relative to a target number of times of ad play second in the list of ad addresses of ads to be played;
playing at the inquiring browsers the ads to be played with the least played ad relative to the target number of times of ad play first in the list for play and ads more frequently played relative to the target number of time of ad play second in the list for ad play;
sending reports of ad play to the advertising system central controller of the play; and,
reordering the list of ad addresses to be played at a time after another ad in the list for play becomes a least played ad relative to a target number of times of ad play.

32. The process of playing banners with advertising to meet quotas of play according to claim 31 comprising the steps of:
the ordering and reordering steps occur at the advertising system central controller.

33. The process of playing banners with advertising to meet quotas of play according to claim 31 comprising the steps of:
the ordering and reordering steps occur at the inquiring browser.

34. The process of playing banners with advertising to meet quotas of play according to claim 31 comprising the steps of:
the reordering step occurs when another ad in the list for play becomes a least played ad relative to a target number of times of ad play.

35. The process of playing banners with advertising to meet quotas of play according to claim 31 comprising the steps of:
the reordering step occurs at an interval after another ad in the list for play becomes a least played ad relative to a target number of times of ad play.

36. In an Internet ad system having:
a website displaying webpages permitting banner advertising;
at least one inquiring browser for viewing webpages from the website;
at least one ad server for providing a banner with advertising;
an advertising system central controller having Internet ad addresses for the at least one inquiring browser to enable retrieval of the banner with advertising over the Internet; and,
means from providing from the advertising system central controller to the inquiring browser the Internet ad address of the at least one ad server to enable the at least one inquiring browser to fetch and display the banner with advertising on a webpage of the website;
a process of distributing a limited number of ads to be played from a large group of ads to be played comprising the steps of:
classifying the websites at the advertising system central controller into discrete classification groups relating to the subject matter of the displayed web pages;
parsing the Internet ad addresses at the advertising system central controller into discrete groups of lists relating to the subject matter of the displayed web pages;
transmitting the identity of the website to the inquiring browser;
transmitting from the inquiring browser the identity of the website to the advertising system central controller;
determining the discrete classification group of the website;
transmitting to the inquiring browser the discrete classification groups relating to the subject matter of the displayed web pages.

37. The process of distributing a limited number of ads to be played from a large group of ads to be played according to claim 36 comprising the steps of:
sorting the groups of ads for sequential play in the inquiring browser at the central controller.

38. The process of distributing a limited number of ads to be played from a large group of ads to be played according to claim 36 comprising the steps of:
sorting the groups of ads for sequential play in the inquiring browser at the inquiring browser.

39. In an Internet ad system having:
a website displaying webpages permitting banner advertising;
at least one inquiring browser for viewing webpages from the website;
at least one ad server for providing a banner with advertising;
an advertising system central controller having Internet ad addresses for the at least one inquiring browser to enable retrieval of the banner with advertising over the Internet; and,
means from providing from the advertising system central controller to the inquiring browser the Internet ad address of the at least one ad server to enable the at least one inquiring browser to fetch and display the banner with advertising on a webpage of the website;
the process of playing ads at an inquiring browser including:

having the browser fetch the address of an ad to be played from the advertising system central controller; and, sending reports of play from the inquiring browser to the advertising system central controller including a query string having an Internet address, a file designation in the system controller, a command designating recording of a record of data, identification of the ad, and a record of the play of the ad.

40. The process of playing ads at an inquiring browser according to claim 39 including:

the sending of reports of play includes sending the identity of the website displaying webpages permitting banner advertising.

41. A process of Internet advertising comprising the steps of:

providing a website permitting banner advertising;

providing at least one inquiring browser to call on the website permitting banner advertising;

providing and advertising system central controller having at least the Internet address of two ads to be played;

diverting the inquiring browser when calling on the website to the advertising system central controller to acquire the Internet address of the two ads to be played;

fetching from the inquiring browser the first ad to be played utilizing the Internet address of the first ad to be played;

playing the first ad to be played for a designated period;

during the designated period, fetching to memory of the browser the second ad to be played using the Internet address of the second ad to be played whereby when the first ad to be played plays for the designated period, at least a part of the second ad has been loaded to memory of the inquiring browser.

* * * * *